United States Patent
Bohra et al.

(10) Patent No.: US 9,348,817 B2
(45) Date of Patent: May 24, 2016

(54) AUTOMATIC GENERATION OF QUESTION-ANSWER PAIRS FROM CONVERSATIONAL TEXT

(71) Applicant: International Business Machines Corporation, Armonk, NY (US)

(72) Inventors: Amit P. Bohra, Maharashtra (IN); Donna K. Byron, Petersham, MA (US); Krishna Kummamuru, Hyderabad (IN); Abhishek Shivkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 14/151,191

(22) Filed: Jan. 9, 2014

(65) Prior Publication Data

US 2015/0193429 A1 Jul. 9, 2015

(51) Int. Cl.
| | |
|---|---|
| *G06F 17/28* | (2006.01) |
| *G06F 17/27* | (2006.01) |
| *G06N 5/04* | (2006.01) |
| *G06F 17/30* | (2006.01) |

(52) U.S. Cl.
CPC ........ *G06F 17/279* (2013.01); *G06F 17/30654* (2013.01); *G06N 5/04* (2013.01)

(58) Field of Classification Search
CPC G06F 17/28; G06F 17/2765; G06F 17/30654
See application file for complete search history.

(56) References Cited

U.S. PATENT DOCUMENTS

| | | |
|---|---|---|
| 7,904,399 B2 | 3/2011 | Subramaniam et al. |
| 2004/0030741 A1 | 2/2004 | Wolton et al. |
| 2009/0216772 A1 | 8/2009 | Goldfarb |
| 2009/0292680 A1 | 11/2009 | Sabani |
| 2011/0125734 A1 | 5/2011 | Duboue et al. |
| 2012/0041937 A1 | 2/2012 | Dhillon et al. |
| 2012/0330882 A1 | 12/2012 | Ferrucci et al. |
| 2013/0177893 A1 | 7/2013 | Feng et al. |

(Continued)

FOREIGN PATENT DOCUMENTS

WO 2013002771 1/2013

OTHER PUBLICATIONS

Shrestha et al. "Detection of Question-Answer Pairs in Email", Aug. 2004, Proceeding, COLING '04 Proceedings of the 20th international conference on Computational Linguistics, Article No. 889.*

(Continued)

*Primary Examiner* — Qian Yang
(74) *Attorney, Agent, or Firm* — Terrile, Cannatti, Chambers & Holland, LLP; Stephen A. Terrile

(57) ABSTRACT

A method, system and computer-usable medium are disclosed for identifying question-answer pair associations within a dialog. Natural language processing (NLP) is used to process a target dialog to identify questions and answers within the dialog. The relative positions of the identified questions and answers in the dialog are determined and then correlated to one another to generate question-answer pair associations. Sub-questions and their associated main questions are identified within the dialog, followed by the elimination of redundant question-answer pairs. Local cues contained in the dialog are then used in scoring and filtering processes to differentiate fact-based questions and answers from those that are opinionated.

14 Claims, 5 Drawing Sheets

(56) References Cited

U.S. PATENT DOCUMENTS

2013/0226559 A1* 8/2013 Lim et al. .................. 704/9
2015/0006143 A1* 1/2015 Skiba .................. G06F 17/271
　　　　　　　　　　　　　　　　　　　　　　　　704/2

OTHER PUBLICATIONS

Kalyanpur et al., "Fact-based question decomposition in DeepQA", May 2012, IBM Journal of Research and Development (vol. 56, Issue: 3.4).*

Tristram, "Mining for Meaning," MIT Technology Review, Jul. 1, 2001, 2 pages.

Li et al, "Using text mining and sentiment analysis for online forums hotspot detection and forecast," Decision Support Systems 48 (2010), Jul. 15, 2008, pp. 354-368.

Azevedo et al., "Qualitative Analysis of Discussion Forums," International Journal of Computer Information Systems and Industrial Management Applications, vol. 3 (2011), pp. 671-678.

The University of Manchester, "Postgraduate Research Projects," established 2004.

Angoss Software Corporation, "Data analysis software with advanced modeling and Strategy Trees," Angoss KnowledgeStudio, Jun. 2013, 6 pages.

Byron et al., U.S. Appl. No. 14/099,926, filed Dec. 7, 2013, entitled Mining Forums for Solutions to Questions.

* cited by examiner

| | |
|---|---|
| Ethan: | Welcome to XXXXX livechat support! How may I help you? |
| Visitor: | Hey, I need to get some product and pricing info for an ARS. |
| Ethan: | We can certainly help you with that ... |
| Ethan: | May I know your exact requirement so I will be able to assist you better? |
| Visitor: | I work for Stetson University College of Law and we would like to start a mock jury trial program |
| Visitor: | What we really need is the moment-to-moment capability. |
| Visitor: | and 20-25 responders |
| Ethan: | sure, we can help you with that. May I have your Name, Company Name, Email address and Phone Number? |
| Ethan: | Also kindly let me know the best time to contact you, our representative will contact you with more details |
| Visitor: | Bill Gxxxr, wqxxx@law.sxxxn.edu, xx7-5xx-7xxx (w), xx1-7ss-xxx5 (c). |
| Ethan: | Thank you Bill |
| Ethan: | You can download your XXXXX software online. Select the number of Audience Response Keypads you need, your MM., software to support, and add it to your shopping cart. Kindly visit the link below for package pricing. |
| Ethan: | We provide 24/7/365 Global technical support and customer care. We ship worldwide. |
| Ethan: | http://www.xxxxx.com/buyonlinelbuy-online.html |
| Ethan: | You can view the details of all products on the page. |
| Visitor: | Actually, I need the info ASAP, so if someone could call first thing in the A.M., that would be great. |
| Ethan: | Yes, I have forwarded your details |
| Ethan: | Our sales representative will contact you at the earliest on Monday |
| Visitor: | Okay. Thanks. |
| Ethan: | You are welcome. |
| Ethan: | Is there anything else I can help you with? |
| Visitor: | Nope. Sorry to bother you on a Sunday night. |
| Visitor: | But thanks |
| Ethan: | No problem at all |
| Ethan: | We are available 24/7/365 days to help you |
| Visitor: | You are welcome! |
| Ethan: | Thank you for visiting. Please contact us at any time we offer live customer support 24 hours a day, 7 days a week, even holidays! |

Jasbirsingh197: |Is it right to invest in single premium insurance?| If yes, suggest any good plan. ⟵ 302

Harshvardhan Roongta: |You should separate your insurance and investments as far as possible. For insurance cover needs, buy Term Plans and for investments use Mutual Funds, FDs, Bonds, etc.| Ask yourself, what is the additional benefit that this insurance policy is giving, which the other investments cannot? ⟵ 304

---

Sagayaraj1968: Sir, I have 10 lacs for investment. Please advise on which segment I should invest.

Harshvardhan Roongta: The investment vehicle to choose for this 10 lacs will depend on many factors, such as time horizon, goals, risk appetites, etc. I would recommend that you take the help of a Financial Planner and have a one-to-one detailed discussion and then make the investment.

---

Satish1471: Sir, |please let me know how to start investing in SIP.| Which funds are better for SIP? ⟵ 306

Harshvardhan Roongta: |Starting a SIP is a very simple process. Step 1) Identify the fund (Index fun is a very good way to begin – Franklin India Index Fund – BSE Sensex Plan), Step 2) Decide the amount you wish to invest every month or quarter, Step 3) Fill in the application form as provided by the Fund House along with the KYC forms.| You may approach the fund house, the Registrar CAMS, or you may take the help of an advisor agent. ⟵ 308

---

Jashbirsingh197: Do suggest some secure investment?

Harshvardhan Roongta: Options for secured investment would be 1) FD, 2) NCDs, 3) Tax-Free Bonds listed on BSE/NSE, 4) Post Office deposits, etc.

---

Vinaykm: Hi, please suggest 4 to 5 good solid companies which I can invest systematically, every moth, for a long period of time (7 to 10 years period)?

Harshvardhan Roongta: I assume you are asking about direct equity investments. Though the PE multiples are high, we maintain a positive view on the FMCG sector to continue to be wealth creators. Nestle, P&G, Glaxo Consumer and ITC. Disclaimer: we do have an investment in these shares as suggested.

---

Ronycoop: Sir your comments for investments all in growth option UTI opp HDFC Equity Reliance Small Cap Icici Pru Focused Bluechip Equity?

Harshvardhan Roongta: All the funds are fundamentally good. You can stay invested.

---

Bpj1982: What portfolio do you suggest for age group of 30 with medium risk and for at least five years?

*FIGURE 3*

AUTOMATIC GENERATION OF QUESTION-ANSWER PAIRS FROM CONVERSATIONAL TEXT

BACKGROUND OF THE INVENTION

1. Field of the Invention

The present invention relates in general to the field of computers and similar technologies, and in particular to software utilized in this field. Still more particularly, it relates to a method, system and computer-usable medium for identifying question-answer pair associations within a dialog.

2. Description of the Related Art

Dialogs between two or more individuals are a part of everyday life and it is common to transcribe certain of these conversations into textual form for various reasons. For example, a transcription of a meeting may contain questions asked by various participants and responses provided by others during the course of one or more dialogs. Such responses may contain answers to a given question, but they may also contain verbiage that may not contain any relevant information. Furthermore, a participant's response may be a question in return. As another example, call center transcriptions may capture a dialog between a customer and an agent. These dialogs may be related to a particular product or a service and will typically contain a variety of questions and answers. As yet another example, an earnings transcription is typically generated when a CEO or CFO announces their company's earnings. These transcriptions not only contain dialogs between the company's representatives and people on the call or at the event, but also various kinds of questions and answers.

In the preceding examples, questions and their corresponding answers typically occur in an unstructured form within a dialog, which can present challenges in identifying associated question-answer pairs. For example, certain questions may not contain any context, or the questions and answers may be very short in length as they represent real-life, informal, conversational exchanges. Furthermore, the questions and their corresponding answers may not be proximate to each other within the dialog. Moreover, the dialog may have several different questions which are answered, but the answers are not particularly important or do not contain significant information.

Known approaches to these challenges include processing textual content to generate fact-based questions and answers, which are then combined to provide associated question-answer pairs. In certain of these approaches, the questions need not be represented in the text as they are generated from facts that are present within the text as knowledge. Accordingly, the resulting question-answer pairs provide a way of representing a knowledge domain in the form of questions and their corresponding answers. Other known approaches are implemented for a given domain. In these approaches, textual content pertaining to a particular domain is processed to generate questions, which if answered, provide a summary of the textual content. For example, one such approach takes an insurance claim as input and generates questions one should ask about the claim to be able to verify whether the claim is true or not. However, none of these approaches provide a way to identify related question and answer pairs that are embedded within a dialog.

SUMMARY OF THE INVENTION

A method, system and computer-usable medium are disclosed for identifying question-answer pair associations within a dialog. In various embodiments, natural language processing (NLP) is used to process a dialog to identify questions and answers in the dialog. The relative positions of the identified questions and answers in the dialog are determined and then correlated to one another to generate question-answer pair associations.

In various embodiments, sub-questions and their associated main questions are identified within the dialog, followed by the elimination of redundant question-answer pairs. In various embodiments, local cues contained in the dialog are then used in scoring and filtering processes to differentiate fact-based questions and answers from those that are opinionated.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2, 3, and 4 show the identification of question-answer pairs within transcriptions of a dialog.

DETAILED DESCRIPTION

Figure 1:
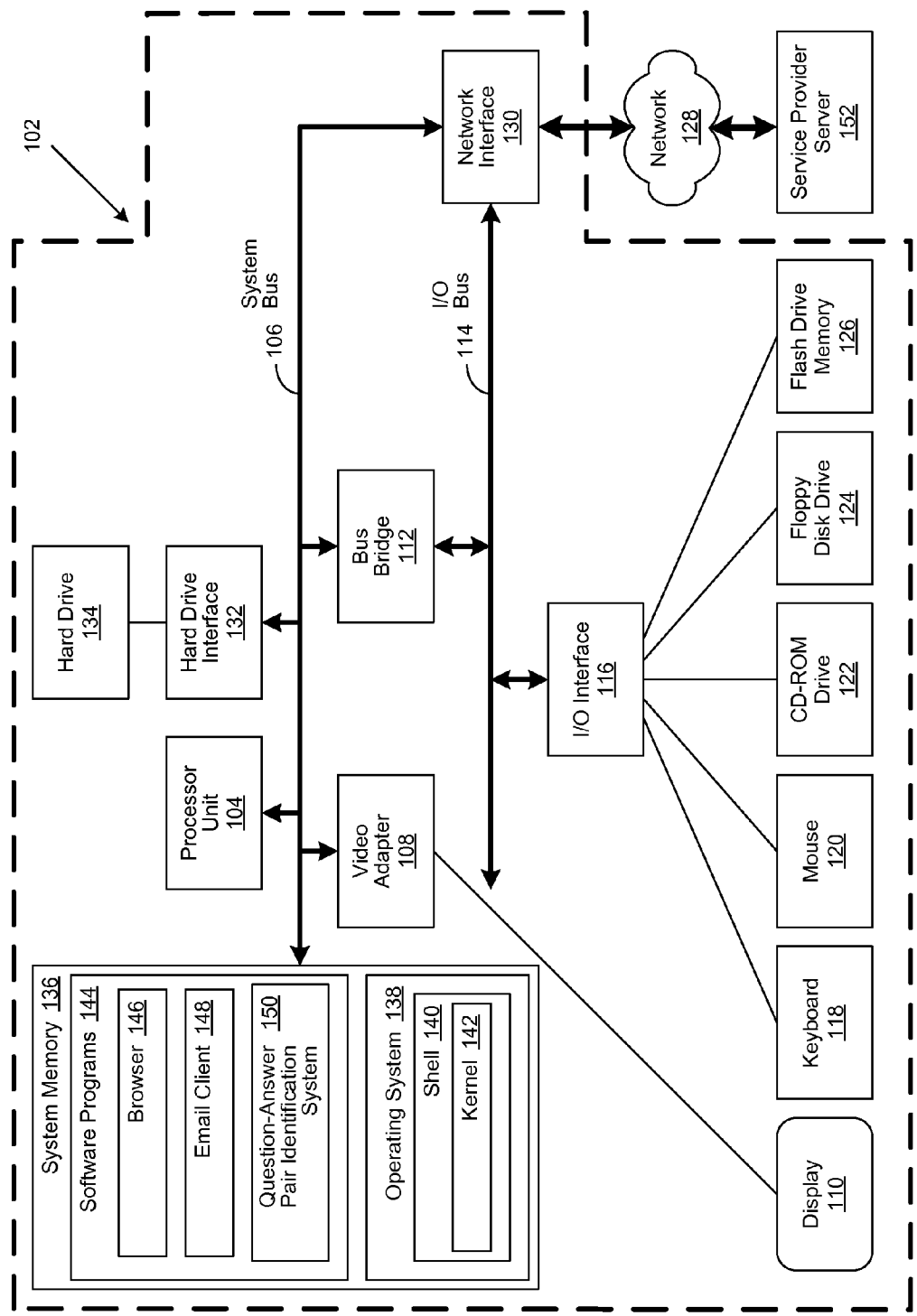
FIG. 1 depicts an exemplary client computer in which the present invention may be implemented.

A method, system and computer-usable medium are disclosed for identifying question-answer pair associations within a dialog. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a question-answer pair identification system 150. In these and other embodiments, the question-answer pair identification system 150 includes code for implementing the processes described hereinbelow. In one embodiment, client computer 102 is able to download the question-answer pair identification system 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 4:
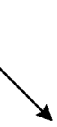

FIGS. 2, 3 and 4 show the identification of question-answer pairs within transcriptions of dialogs implemented in accordance with an embodiment of the invention. As used herein, a dialog broadly refers to an explicit or implicit exchange of information between two entities. Such exchanges may be direct, such as a conversation between two individuals, or indirect, such as through a third person or an intermediary form of communication (e.g., electronic mail, instant messenger, "chat," web forms, etc.). Further, these exchanges may be transcribed into various forms familiar to skilled practitioners of the art for a variety of reasons. These same skilled practitioners will realize that many such examples of the foregoing are possible and are not intended to limit the spirit, scope or intent of the invention.

In various embodiments, natural language processing (NLP) approaches known to skilled practitioners of the art are used to process a dialog to identify question-answer pair associations. It will be appreciated that the identification of such question-answer pair associations within a dialog can present challenges. For example, there may be more than two participants in a dialog, such as during a business meeting, a press release conference, or a question and answer session during an industry forum. Such dialogs may contain questions asked by various participants and responses by yet others. Further, any given participant may ask questions at one point in the dialog yet provide answers at another. Dialogs may present additional challenges as a participant's response to a question may provide an answer, but their response may also contain verbiage that does not contain any relevant information, or possibly, a question in return.

Additionally, questions and their corresponding answers typically occur in an unstructured form within a dialog, which can present challenges in identifying associated question-answer pairs. For example, certain questions may not contain any context. As another example, questions and answers within a dialog may be very short in length as they represent real-life, informal, conversational exchanges. Furthermore, such questions and their corresponding answers may not be proximate to each other. For example, a question may be asked in the course of a dialog, only to have one or more other dialog participants make various statements that may not be related to the question. As a result, not only is the dialog interrupted, but the interjected statements may separate the original question and an answer that may be provided at a somewhat later time in the dialog. As yet another example, a dialog may contain several different questions, each of which are answered, but the answers are not particularly important, nor do they contain significant information. Moreover, such dialogs may contain conversations that lack context, be grammatically incorrect, or reflect informal interactions.

Referring now to FIG. 2, a transcription of a call center dialog 200 between a customer and a service representative is shown, where an answer 204, 208 may not immediately follow its respective question 202, 206 in the dialog, or additional questions may be asked to clarify the original question. Furthermore, an answer 210 may be provided in pieces at different times within the dialog. As another example, FIG. 3 is a transcription of a group meeting dialog 300 between a presenter and multiple attendees. As shown in FIG. 3, may contain questions 302, 306 asked by more than one person, with corresponding responses 304, 308 provided by either an individual or many others.

As yet another example, FIG. 4 is a transcription of an earnings announcement 400. As shown in FIG. 4, such transcriptions may also contain dialogs that may be formalized introductory statements 402, 404. Furthermore, such dialogs may contain redundant, insignificant or unimportant information. Moreover, a question 406, 408 and its corresponding answer 410, 412, 414, 416 may be respectively presented in two or more parts. Likewise, a disproportionately brief answer 420 to a detailed question 418 may fail to convey very much detail in response.

These challenges are addressed in various embodiments through the implementation of various supervised and unsupervised processes to determine the relative position of questions and answers that are not proximate to one another in a dialog. The identified question-answer pairs are then correlated to one another. In certain embodiments, local cues contained in the dialog are used in scoring and filtering processes to differentiate fact-based questions and answers from those that are opinionated.

In various embodiments, such local cues indicate sections within the dialog that are either questions or answers. For example, interjections such as "Aah," "OK!," or "Oh!" may indicate that an answer or clarification has been provided in response to a question. Likewise, affirmative phrases such as, "Thanks, I got it." or "Yes, OK." may indicate the end of a particular text segment and the beginning of a new segment for analysis. In these embodiments, questions may likewise be identified by the use of various punctuation symbols such as, '?' or clarifying questions, such as, "as in?" or "for example?" Other local clues may include phrases such as, "That answers my question," "That's it.," or "No more questions." Likewise, opinions may be indicated by phrases such as, "I think . . . ," "I guess so . . . ," "Probably," "Likely," or "Mostly," while the start of a conversation may be indicated by a phrase such as, "Quick question," "Do you have a moment?" or "Can I ask a . . . "

In certain embodiments, the identification of questions within a target dialog may be facilitated by contextual knowledge of the domain topic. In various embodiments, common or recurring questions, and their associated answers, are identified by processing related dialogs. For example, common issues faced by customers may be identified by processing transcriptions of multiple call center dialogs.

In concert with these local clues and other indications, machine learning models are implemented in various embodiments to respectively identify questions, answers, opinions and expressions within a dialog. In these embodiments, the machine learning model is trained by using conversational dialogs to identify a question or an answer. For example, call centers and technical support organizations commonly use an extensive set of Frequently Asked Questions (FAQ) to provide answers. Such a body of FAQ typically contains known and validated question-answer pairs that can be used to train a machine learning model.

In various embodiments, semantic similarities in such known and validated question-answer pairs are used in conjunction with a predetermined segment of a target dialog to build a training set of questions and answers. In these embodiments, NLP features from these similarities are used by the machine learning model to identify questions and related answers by noting the presence of "wh" words, such as when, what, where, and who. Symbols (e.g., '?') indicating a question, a clarification, or an expression are likewise used in these embodiments, along with noun phrases and affirmative words indicating answers. In certain embodiments, a classifier is implemented with the preceding features to classify a segment of a dialog based upon its own features in combination with the context of adjacent or proximate text within the dialog. Once the questions and answers are identified, the questions may need to be classified as being either the main question or a sub-question. As used herein, a sub-question refers to a question that is asked to clarify a primary question.

In these embodiments, redundancy is reduced, a succinct summary of the dialog is generated, and the type of question asked within the dialog is identified as a result of scoring and filtering the questions and answers. In various embodiments, the scoring and filtering of the questions and answers includes assigning a score to a predetermined question-answer pair that reflects the correlation between the question and its respective answer. In certain embodiments, the score is determined using a set of scoring factors, such as the overlap of noun phrases or topics between a predetermined question and its respective answer. In various embodiments, the scoring is determined through the use of anaphoras, which are one or more words referring to or replacing a word used earlier in a sentence, to avoid repetition. An example of an anaphora is the word "do" in the sentence, "I like it and so do they." In certain embodiments, a user provides an input score, which is then used to perform filtering operations to remove predetermined question-answer pairs that have been previously identified. As a result of the foregoing, not only is time saved when digesting information contained within the dialog, but identification of the domain topic is facilitated as a result of the kinds of questions that are asked and their associated answers.

Figure 5:
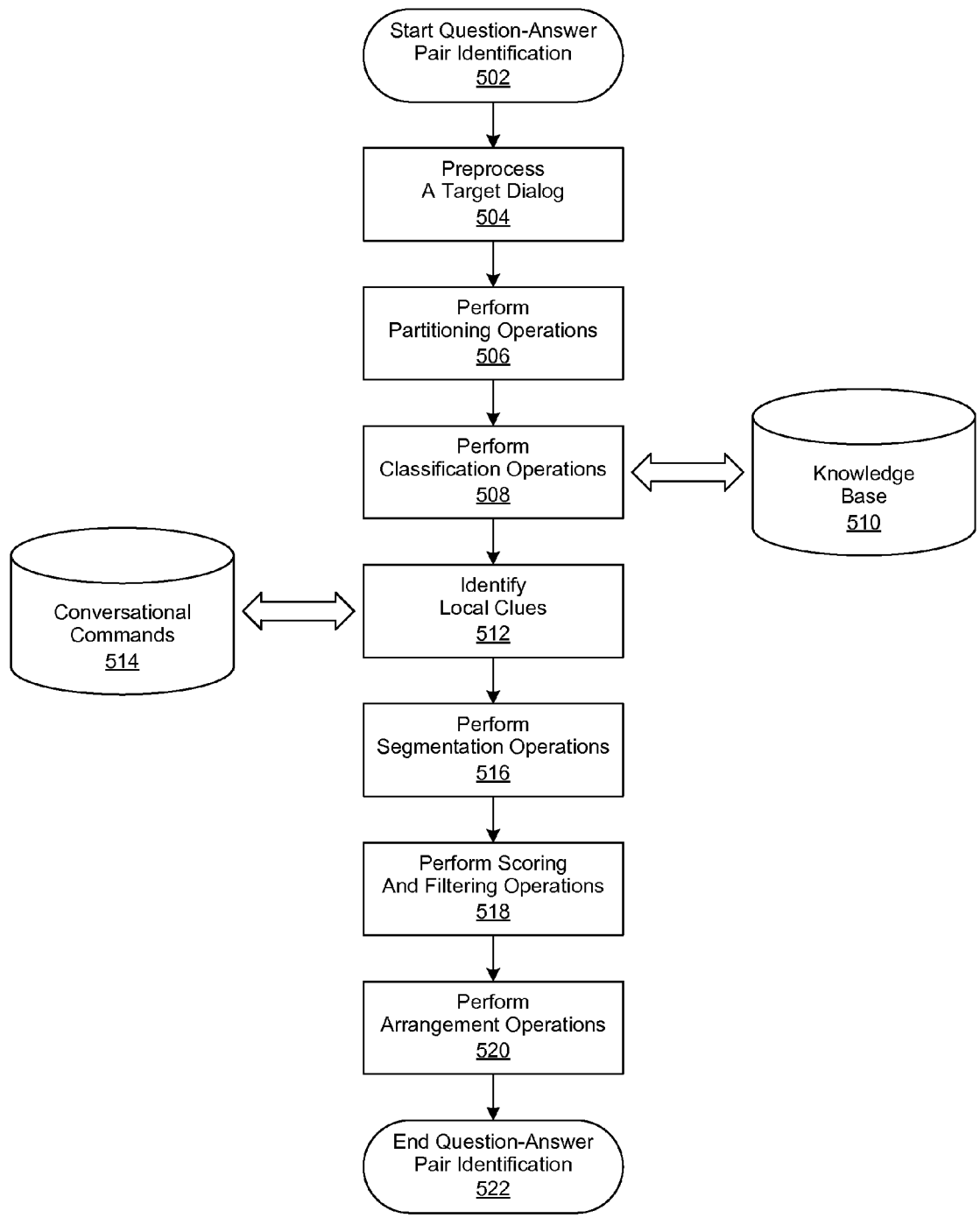
FIG. 5 is a generalized flowchart of the performance of operations to identify question-answer pairs within a dialog.

FIG. 5 is a generalized flowchart of the performance of operations implemented in accordance with an embodiment of the invention to identify question-answer pairs within a dialog. In this embodiment, question-answer pair identification operations are begun in step 502, followed by the preprocessing a target dialog in step 504 to filter and remove content that doesn't contain significant clues, as described in greater detail herein. Partitioning operations are then performed in step 506 to partition the dialog into smaller, meaningful portions of the dialog.

Then, in step 508, classification operations are performed to classify each of the smaller portions of the dialog as a question, an answer, an opinion, or an expression, as described in greater detail herein. In various embodiments, a knowledge base 510 familiar to skilled practitioners of the art is used to perform the classification operations. The dialog is then further processed in step 512 to identify local clues, based upon the proximity and semantic similarities between the previously-classified questions, answers, opinions and expressions. As described in greater detail herein, these local clues are used to associate candidate answers to a target question within the dialog. In various embodiments, conversational commands 514, familiar to those of skill in the art and relevant to the target dialog, are used to identify local clues within the dialog.

The identified local clues are then used in step 516 to perform segmentation operations to segment the dialog into segments containing a question and its corresponding answer. Scoring and filtering operations, described in greater detail herein, are then performed in step 518 to score each question-answer pair resulting from the segmentation operations performed in step 516. Then, in step 520, arrangement operations are performed to produce an index or table of questions and answers corresponding to the question-answer pairs generated from the original, unstructured dialog. Question-answer pair identification operations are then ended in step 522.

Although the present invention has been described in detail, it should be understood that various changes, substitutions and alterations can be made hereto without departing from the spirit and scope of the invention as defined by the appended claims.

What is claimed is:

1. A computer-implemented method for identifying question-answer pairs, comprising:
processing a dialog to identify questions and answers in the dialog;
processing the identified questions and answers to generate question-answer pairs, the processing the identified questions and answers to generate question-answer pairs being based upon a machine learning model, the machine learning model being trained using conversational dialogs containing known and validated question-answer pairs;
identifying the question-answer pairs within the dialog;
scoring the question and answer pairs based upon local cues contained in the dialog, the scoring reflecting a correlation between a question and a respective answer of a question-answer pair, the scoring being performed to differentiate fact-based questions and answers from those that are opinionated; and,
providing a tangible output via a Liquid Crystal Display (LCD) type display, the tangible output comprising an index of questions and answers corresponding to the question-answer pairs; and wherein
the processing the dialog comprises performing a classification operation, the classification operation classifying portions of the dialog as a question, an answer, an opinion and an expression, the classification operation being performed using a knowledge base;
conversational commands are used to identify the local clues contained in the dialog; and,
arrangement operations are performed to generate an index of questions and answers corresponding to question-answer pairs generated from the identified questions and answers identified by processing the dialog.

2. The method of claim 1, wherein natural language processing is used to perform the processing.

3. The method of claim 1, further comprising:
identifying a sub-question within the dialog; and
determining a main question to which the sub-question is associated with.

4. The method of claim 1, further comprising:
eliminating redundant question-answer pairs.

5. A system comprising:
a processor;
a data bus coupled to the processor; and
a computer-usable medium embodying computer program code, the computer-usable medium being coupled to the data bus, the computer program code used for identifying question-answer pairs and comprising instructions executable by the processor, the instructions configured for:
processing a dialog to identify questions and answers in the dialog;
processing the identified questions and answers to generate question-answer pairs, the processing the identified questions and answers to generate question-answer pairs being based upon a machine learning model, the machine learning model being trained using conversational dialogs containing known and validated question-answer pairs;
identifying the questions-answer pairs within the dialog;
scoring the question and answer pairs based upon local cues contained in the dialog, the scoring reflecting a correlation between a question and a respective answer of a question-answer pair, the scoring being performed to differentiate fact-based questions and answers from those that are opinionated; and,
providing a tangible output via a Liquid Crystal Display (LCD) type display, the tangible output comprising an index of questions and answers corresponding to the question-answer pairs; and wherein
the processing the dialog comprises performing a classification operation, the classification operation classifying portions of the dialog as a question, an answer, an opinion and an expression, the classification operation being performed using a knowledge base;
conversational commands are used to identify the local clues contained in the dialog; and,
arrangement operations are performed to generate an index of questions and answers corresponding to question-answer pairs generated from the identified questions and answers identified by processing the dialog.

6. The system of claim 5, wherein natural language processing is used to perform the processing.

7. The system of claim 5, further comprising:
identifying a sub-question within the dialog; and
determining a main question to which the sub-question is associated with.

8. The system of claim 5, further comprising:
eliminating redundant question-answer pairs.

9. A non-transitory, computer-readable storage medium embodying computer program code, the computer program code comprising computer executable instructions configured for:

processing a dialog to identify questions and answers in the dialog;

processing the identified questions and answers to generate question-answer pairs, the processing the identified questions and answers to generate question-answer pairs being based upon a machine learning model, the machine learning model being trained using conversational dialogs containing known and validated question-answer pairs;

identifying the questions-answer pairs within the dialog;

scoring the question and answer pairs based upon local cues contained in the dialog, the scoring reflecting a correlation between a question and a respective answer of a question-answer pair, the scoring being performed to differentiate fact-based questions and answers from those that are opinionated; and, providing a tangible output via a Liquid Crystal Display (LCD) type display, the tangible output comprising an index of questions and answers corresponding to the question-answer pairs; and wherein the processing the dialog comprises performing a classification operation, the classification operation classifying portions of the dialog as a question, an answer, an opinion and an expression, the classification operation being performed using a knowledge base;

conversational commands are used to identify the local clues contained in the dialog; and, arrangement operations are performed to generate an index of questions and answers corresponding to question-answer pairs generated from the identified questions and answers identified by processing the dialog.

10. The non-transitory, computer-readable storage medium of claim 9, wherein natural language processing is used to perform the processing.

11. The non-transitory, computer-readable storage medium of claim 9, further comprising:

identifying a sub-question within the dialog; and determining a main question to which the sub-question is associated with.

12. The non-transitory, computer-readable storage medium of claim 9, further comprising:

eliminating redundant question-answer pairs.

13. The non-transitory, computer-readable storage medium of claim 9, wherein the computer executable instructions are deployable to a client system from a server system at a remote location.

14. The non-transitory, computer-readable storage medium of claim 9, wherein the computer executable instructions are provided by a service provider to a user on an on-demand basis.

\* \* \* \* \*